(No Model.)
G. J. HISE.
RUBBER BUMPER FOR HORSES' HEADS.
No. 275,654.        Patented Apr. 10, 1883.
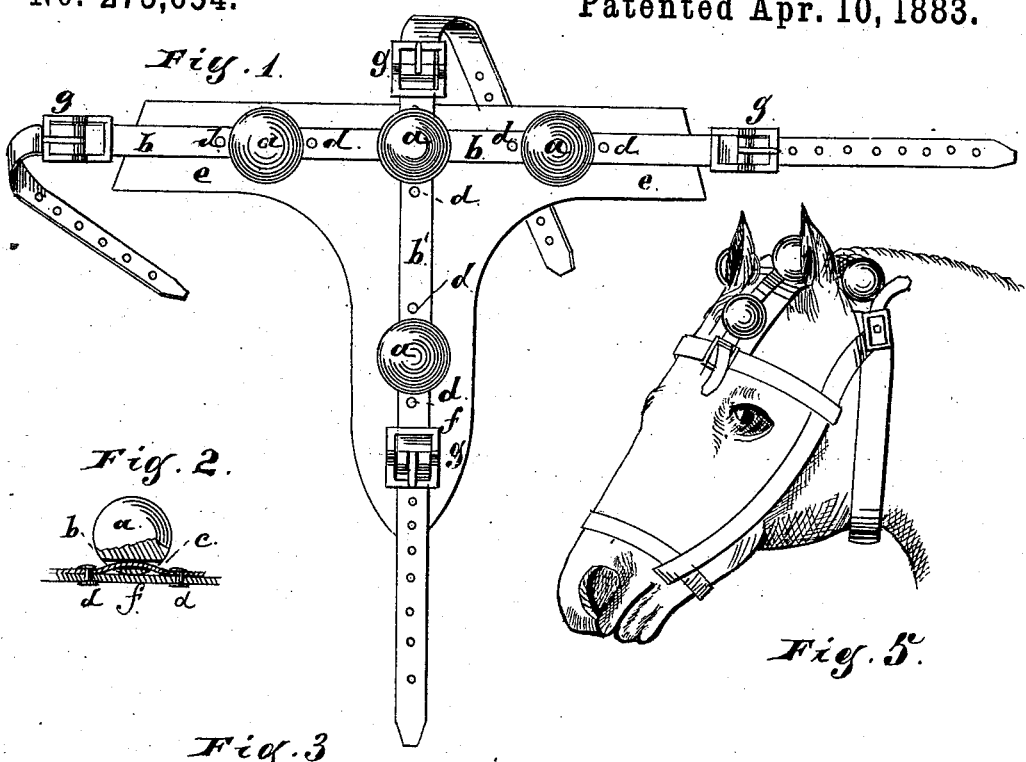
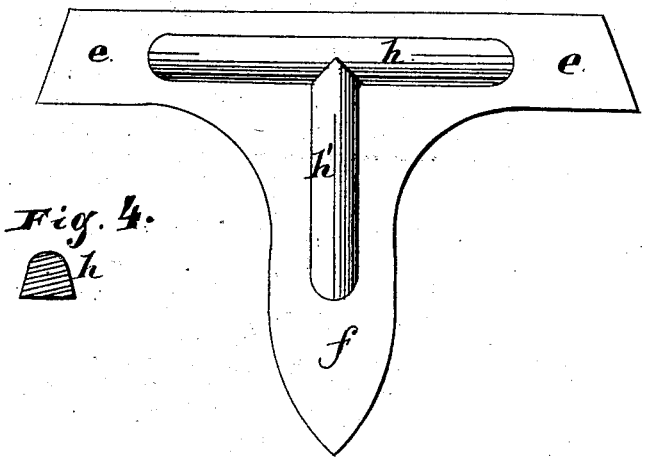
Witnesses:
Albert H. Adams.
Edgar T. Bond.
Inventor:
George J. Hise.

UNITED STATES PATENT OFFICE.

GEORGE J. HISE, OF CHICAGO, ILLINOIS, ASSIGNOR TO JOHN H. FENTON, OF SAME PLACE.

RUBBER BUMPER FOR HORSES' HEADS.

SPECIFICATION forming part of Letters Patent No. 275,654, dated April 10, 1883.

Application filed October 9, 1882. (No model.)

*To all whom it may concern:*

Be it known that I, GEORGE J. HISE, residing at Chicago, in the county of Cook and State of Illinois, and a citizen of the United States, have invented a new and useful Improvement in Rubber Bumpers for Horses' Heads, of which the following is a full description, reference being had to the accompanying drawings, in which—

Figure 1 is a plan view, showing the complete device, with rubber balls forming the bumper; Fig. 2, a detail, showing one form of attaching rubber balls for forming the bumpers; Fig. 3, a plan view, showing the base with the attaching-straps removed and a bumper made of a T-shaped rubber piece; Fig. 4, a cross-section of the bumper of Fig. 3; Fig. 5, a side view of a horse's head, showing the device of Fig. 1 as applied in use.

In the transportation of horses, owing to the want of sufficient accommodations and other causes, there is more or less danger and liability of injury or disfigurement from bumps, especially around the head.

The object of this invention is to prevent injurious effects to the head, in case of bumping or contact, and thereby overcome this objection arising in the transportation of horses; and its nature consists in providing a bumper or guard of rubber, formed as hereinafter described, and adapted to be applied to the head of a horse and form a protection for the top and front and sides, as hereinafter specified.

In the drawings, $a$ represents rubber balls, which are to be arranged as shown, to bring them in position in relation to the head of the horse, as shown in Fig. 5, or in some other suitable manner that will protect the head of the horse against contact; $b\ b'$, straps of leather or other suitable material for attaching the ball-bumpers $a$ in correct position; $c$, slits in the balls $a$ for the passage of the strap $b$; $d$, rivets for attaching the straps to the base, and, as shown, for keeping the balls in place, the rivets being applied one on each side of each ball; $e\ f$, the base, formed of a piece of leather or other suitable material, cut in somewhat of a T form, as shown in Fig. 1, or in other form which can be attached to the head of the horse and have one portion on top and the other extend partly down the front; $g$, buckles, one, as shown, on each end of each strap $b\ b'$, with the ends of the straps extending beyond its buckle, so that it can turn after being passed under the halter and form a loop for the attachment of the bumper; or the bumper could be otherwise attached to the halter or headgear of the horse.

In manufacture, with rubber balls for the bumpers or guards, the balls can be slipped on the straps $b\ b'$—two balls on each strap—and the straps are secured to the base $e\ f$ by the rivets $d$ or otherwise, the balls being slipped on the respective straps to bring the balls on the strap $b$ in position to form a bumper or guard for the head of the horse on each side, as shown in Fig. 5, and the balls on the strap $b'$ to form a bumper or guard for the top and front of the head of the horse, as shown in Fig. 5, the ball forming the bumper or guard for top being, as shown, located at the point of crossing of the straps $b\ b'$. This arrangement and mode of attachment is that shown in Fig. 1; but it will be understood that the manner of connecting the ball to the straps, and the straps to the base, and the form of the base can be varied from that shown, so long as the balls are arranged to form a guard or protector for the head of the horse when attached, either as shown in Fig. 5 or in some other suitable manner.

In Fig. 3 another form of bumper or guard is shown, in which such bumper or guard is made of a piece of rubber, $h\ h'$, of a T shape, which is secured to the base $e\ f$ in any suitable manner. The form of rubber in cross-section may be as shown in Fig. 4, or it may be otherwise formed. Suitable straps, arranged as shown in Fig. 1, or otherwise, are to be applied to the base $e\ f$ of Fig. 3 for attaching the device to the head of the horse to bring the portion $h$ of the bumper on top and the portion $h'$ in front. Instead of straps and buckles for attachment to the head of the horse, tying-strings or other means could be used for this purpose.

In use the device is attached to the halter or head-gear of the horse to bring the bumper in front and on top, as shown in Fig. 5, so that if the horse throws its head up, sidewise, or forward the bumper will receive the shock of any blow or concussion, and being of a yielding nature the severity of the blow or concussion will not be transmitted to the head of the horse, as would be the case if the bumper were not used.

This bumper is simple in construction, easily applied, and will do the work for which it is intended in an effectual and reliable manner; and by making it of rubber, either in the form of balls or otherwise, a resistance to the blow or concussion is offered, which will prevent such blow or concussion from injuring the horse, which is not the case where a stuffed pad of yielding material which does not act to resist the blow or concussion is used. The rubber is also the most serviceable and durable, standing a greater amount of wear than a stuffed pad, and its resisting qualities, combined with its elasticity, renders it the best material against injury from the blow or compression.

If desired, for the purpose of additional strength, one or more layers of canvas or leather may be combined with the rubber.

Four balls are shown, but the number may be varied to suit; and the frame or bumper shown is of a shape to protect the parts of the horse's head most likely to come in contact with surrounding objects, but the arrangement or shape may be varied from that shown, so long as a rubber bumper is furnished for protection.

This shield or bumper may be attached to the halter or bridle, or it may be made to form a part of either without departing from my invention, the essential feature of which is the furnishing of a guard or bumper of india-rubber.

Although the bumper is designed for use more particularly in the transportation of horses, it can also be used as a guard against injury while standing in their stalls.

What I claim as new, and desire to secure by Letters Patent, is as follows:

A guard or protector for preventing injury to a horse's head, consisting of an elastic bumper, and means, substantially as described, for supporting the same on the head of the horse, for the object herein stated.

GEORGE J. HISE.

Witnesses:
ALBERT H. ADAMS,
EDGAR T. BOND.